United States Patent [19]
Paulus et al.

[11] Patent Number: 5,521,969
[45] Date of Patent: May 28, 1996

[54] TELEPHONE CALLER IDENTITY DELIVERY SYSTEM AND METHOD WITH ENHANCED CALLER PRIVACY

[75] Inventors: Conrad J. Paulus, Bridgewater; Robert M. Rubin, Morristown; Joseph J. Serinese, Bridgewater, all of N.J.

[73] Assignee: AT&T Corp., Murray Hill, N.J.

[21] Appl. No.: 323,294

[22] Filed: Oct. 14, 1994

[51] Int. Cl.[6] .......................... H04M 17/00; H04M 3/42; H04M 3/00
[52] U.S. Cl. .......................... 379/142; 379/201; 379/245
[58] Field of Search .................................. 379/127, 142, 379/201, 245, 246, 220, 207

[56] References Cited

U.S. PATENT DOCUMENTS

| | | | |
|---|---|---|---|
| 4,277,699 | 7/1981 | Sheinbein | 379/142 X |
| 5,163,087 | 11/1992 | Kaplan | 379/142 X |
| 5,341,414 | 8/1994 | Popke | 379/142 |

OTHER PUBLICATIONS

Popular Science, "National Caller ID?" Sep. 1992.
Philip Havens, The Institute (IEEE), "New Regulations Clears the Way for Caller ID," 1995.
Belleure, TR-TSY-000031, "Class Feature: Calling Number Delivery".

*Primary Examiner*—Stephen Chin
*Assistant Examiner*—Paul Loomis

[57] ABSTRACT

A system and method are disclosed for alerting a person placing a telephone call when a dialed number subscribes to a Caller Identification Service. A long distance party is called direct using standard 1+ calling. The call is routed through a long distance carrier switching network which is coupled to a signaling network. The signaling network routes the caller's identification information together with the dialed number to the switches in the switching network. The switching network includes a subscription table for determining whether the dialed number subscribes to the aforesaid service. If the dialed number is a subscriber, the caller's identification information and the dialed number are routed from the switching network to a Customer Long Distance Adjunct. The adjunct transmits a message to the caller via the switching network informing the caller that the dialed number is a subscriber. The message may also instruct the caller on the procedure for blocking or unblocking delivery of his identification information. The caller is then provided with the opportunity to direct the adjunct to block or unblock delivery of this information to the dialed number.

14 Claims, 1 Drawing Sheet

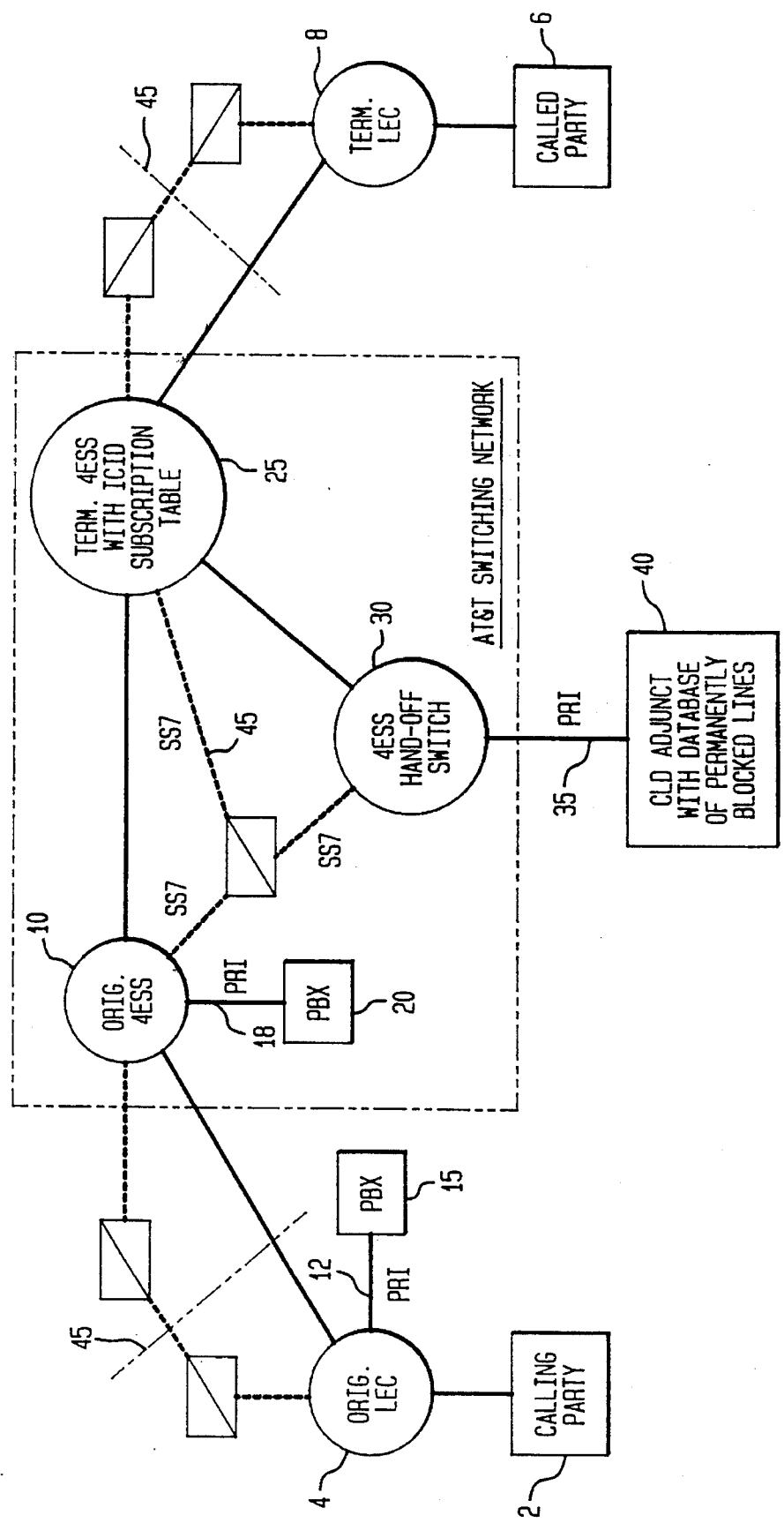

5,521,969

TELEPHONE CALLER IDENTITY DELIVERY SYSTEM AND METHOD WITH ENHANCED CALLER PRIVACY

TECHNICAL FIELD

This invention relates generally to Inter-LATA Caller ID Delivery (ICID) Service and more particularly to systems and methods for alerting a person placing a telephone call when the called party subscribes to a Caller ID service and providing the caller with the opportunity of preventing his/her caller identification information from being forwarded to the called party.

BACKGROUND

The Intra-LATA Caller Identity Delivery (CID) Service which is currently offered by some telephone companies raises serious social concerns regarding a caller's right to privacy. These concerns are reflected in the various states' Public Utility Commission regulations which require that CID service providers offer callers the opportunity to maintain their anonymity when calling a CID subscriber. This requirement typically has been fulfilled: (1) on a call-by-call basis by providing callers with a universal CID blocking code (callers wishing to remain anonymous enter the code from the touch-tone keypad of their telephone upon going off-hook and receiving dial tone) or, (2) on a permanent basis by placing the caller's directory number in a database of permanently blocked lines. The conventional methods of CID blocking nevertheless suffer from some serious deficiencies.

For example, both alternatives assume that all callers are aware that their CID information may be disclosed to a CID subscriber and, that these same callers are further cognizant of the means available to avert such a disclosure. The fact of the matter is that most callers are unfamiliar with either of the above-identified CID blocking alternatives.

The call-by-call blocking alternative suffers from an additional shortcoming; it requires callers to enter a CID blocking code without their knowing if the called party is a CID subscriber. Therefore, this alternative is inefficient in terms of the amount of time which callers spend entering a blocking code for calls made to persons who do not subscribe to the CID service.

The "permanent" blocking alternative likewise suffers an additional deficiency; it requires that the caller place his call from a phone whose directory number is stored in a database of permanently blocked lines. As such, this alternative fails to provide callers with a CID blocking capability for calls placed from an "unfamiliar" phone.

It is worthy of note that only Intra-LATA CID Delivery Service is currently commercially available. As such, an originating LEC which does not offer Intra-LATA CID, likewise does not offer CID blocking. In the Inter-LATA CID (ICID) world of the present invention, callers would therefore need to be provided with a method for blocking the delivery of their CID information for calls placed from a LATA which does not offer CID blocking (e.g. LATA 1) to a LATA which offers ICID (e.g. LATA 2). More importantly, that method would need to overcome the above-identified shortcomings present in the conventional methods of CID blocking.

SUMMARY OF INVENTION

The above-identified problems are solved on an Inter-LATA basis and a technical advance is achieved in the art by providing the calling party with an option to specify a privacy status for calls to an ICID subscriber. This option (which is provided on a call-by-call basis for calls placed from any phone) includes the following: (1) an interruptible announcement to the caller that the called party is an ICID subscriber together with instructions on how the caller may block or unblock delivery of his ICID information; (2) an opportunity for the caller to activate this selective blocking capability; and (3) an option to the ICID subscriber not to accept calls from persons who block delivery of their ICID information. This service may be provided in addition to any calling identity delivery blocking feature available from the originating LEC.

Other and further aspects of the present invention will become apparent during the course of the following description and by reference to the attached drawing.

BRIEF DESCRIPTION OF THE DRAWING

FIG. 1 is a block diagram of an Inter-LATA CID architecture embodying the present invention.

DETAILED DESCRIPTION

In an embodiment of the present invention disclosed herein and in FIG. 1, the Inter-LATA CID (ICID) service provider (e.g. AT&T) maintains a trigger table containing the telephone numbers of all ICID subscribers. A caller from a domestic location goes off-hook and gets dial tone. If the originating local exchange carrier (LEC) end office provides caller ID blocking (CIDB), the caller may dial a CIDB code which changes the presentation field of his Calling Party Number (CPN) for this call. The caller then dials the number of the person with whom he wishes to communicate.

The originating LEC identifies the call as an AT&T Inter-LATA call and creates an Initial Address Message (IAM). The IAM includes as parameters the dialed number and the CPN (together with the presentation field of the CPN). The LEC then routes the call to the originating AT&T switch (OAS).

The OAS creates an IAM with the CPN unchanged and routes the call to a terminating AT&T switch (TAS). The TAS compares the dialed number in the incoming IAM against a trigger table of ICID subscribers. If the dialed number is an ICID subscriber, the TAS sends the IAM either directly or via a Hand-Off AT&T Switch (HAS) to an appropriate Customer Long Distance Adjunct (CLD).

After establishing a voice connection with the caller, the adjunct: (1) compares the incoming CPN against a database of permanently blocked lines (maintained in the adjunct); and (2) plays a pre-recorded message which alerts the caller to impending CPN disclosure and provides instruction as to how to block or unblock delivery of the CPN. It should be noted that the database is queried only if the privacy field of the incoming CPN is "presentation allowed" and, that the pre-recorded message is interruptible by the caller at any time.

Thereafter, the caller is provided with an opportunity to take action via a voice or DTMF interface to affect delivery of his CPN. Depending upon the action taken by the caller and whether the incoming CPN was in the database of permanently blocked lines, the presentation field of the outgoing CPN is determined by the adjunct in accordance with TABLE I, infra.

If the presentation field of the outgoing CPN is "presentation restricted", the adjunct compares the dialed number against information contained in a destination number trigger table to determine whether the called party accepts anonymous telephone calls. If the called does not accept anonymous calls, the adjunct plays another announcement informing the caller of this, and sends a message to the HAS to tear down the call.

Otherwise, the call and the CPN are routed back to the TAS and handed over to the terminating LEC, which in turn checks the subscription of the dialed number to the ICID delivery feature. Only if the called party is a subscriber and the presentation field of the CPN is "presentation allowed", does the LEC deliver the CPN to the called party's line.

Referring now more particularly to the drawing of FIG. 1, a more detailed description of a preferred embodiment will be made. It is assumed that a terminating local exchange carrier (LEC) end office (8) which offers Intra-LATA CID service will support Inter-LATA CID (ICID) service. This requires that the terminating LEC 8 maintain (or at least have access to) a database of customers who are also ICID subscribers and, that the LEC 8 deliver CPN information to these subscribers in accordance with the privacy status of the CPN as determined by the ICID provider (e.g., AT&T). This embodiment further assumes end-to-end SS7 connectivity (45) for transmitting caller identity information between the originating and terminating LEC end offices (4, 8).

From a domestic location, a calling party (2) goes off-hook and gets dial tone. If the originating LEC (4) does not offer CID delivery service, the caller (2) proceeds to dial the number of the called party (6) (i.e. 1+NPA+NXX+XXXX). However, if the originating LEC 4 does offer CID delivery service, the caller 2 has the option of first entering a Caller Identity Delivery Blocking (CIDB) code (e.g. *67) to affect delivery of his Calling Party Number (CPN).

If the caller 2 does not enter the CIDB code, but instead immediately dials the number of the called party 6, the originating LEC 4 compares the CPN against the Permanent Presentation Status (PPS) of that CPN contained in a trigger table. The trigger table resides in the LEC 4. The LEC 4 then uses that PPS (which could be either "presentation allowed" or "presentation restricted") as the presentation indicator of the CPN for the call. It should be noted that when a directory number is first assigned to a customer, the LEC sets the PPS of the CPN to "presentation allowed" until directed otherwise by the customer.

If the caller 2 enters the CIDB code (assuming that he knows of it and remembers to enter it), the originating LEC 4 recognizes the code and changes the value of the PPS (from either "presentation allowed" to "presentation restricted" or vice versa) for this call only and returns dial tone to the caller 2. The caller 2 then dials the number of the called party 6.

Note that for a call originating from a Private Branch Exchange (PBX) (15) with a Primary Rate (PRI) interface (12) to the originating LEC 4, the PBX 15 may send the CPN to the LEC in a Q.931 SETUP message.

Once the caller 2 dials the called party's number, the originating LEC 4 identifies the call as an AT&T Inter-LATA call if the calling line is presubscribed to AT&T or if the caller 2 dialed the AT&T Carrier Access Code (i.e. 10288).

If the originating LEC 4 is equipped with ISDN User Part (ISUP) circuits, the LEC 4 creates an Initial Address Message (IAM) for the call. The IAM contains the Automatic Number Identification (ANI), the Called Party Number, and the Calling Party Number (CPN) as parameters. The CPN parameter includes the CPN presentation indicator.

The originating LEC 4 then routes the call to the next switch. If the next switch is an access tandem, this switch creates another IAM containing all relevant information received from the LEC and routes the call to the originating AT&T switch (OAS) (10). Note that if the originating LEC 4 is equipped with only a Multi-frequency (MF) signaling capability (i.e. no ISUP circuitry), then the CPN information will not be sent to the next switch (access tandem or OAS).

For direct connect customers (i.e. cases where the originating LEC 4 is bypassed entirely), the OAS 10 would receive the CPN together with the presentation indicator directly from the originating PBX (20) as part of the Q.931 Setup message sent via a PRI interface (18).

The OAS 10 creates an IAM with the CPN parameter unchanged (or missing in the case of MF signaling in the originating LEC 4) and routes the call to the Terminating AT&T Switch (TAS) (25). It is assumed that a "via" switch in the path between the OAS 10 and the TAS 25 would route the IAM unchanged.

If the TAS 25 receives an incoming IAM which contains a CPN parameter, the TAS 25 compares the Called Party Number parameter of the IAM against information contained in an ICID Subscription Table (resident in the TAS 25) to determine whether the called party 6 is an ICID subscriber.

If the called party 6 is not an ICID subscriber, the call proceeds as it would for any other call. The TAS 25, which is typically connected to the terminating LEC 8 via an SS7 network 45, creates a new IAM without the CPN and routes the call to the terminating LEC 8.

If the called party 6 is an ICID subscriber, a Customer Long Distance (CLD) adjunct 40 is accessed to implement the AT&T ICID enhanced caller privacy feature. The TAS 25 checks for an Adjunct Logical Address (ALA) and invokes the REACH feature (a method of terminating calls well-known to those skilled in the art) to establish the call connection to the CLD adjunct 40 through a Hand-off AT&T Switch (HAS) (30). Note that if the TAS 25 is directly connected to the CLD adjunct 40 the call can be set up without REACH.

The HAS 30 formulates a Q.931 SETUP message and sends it to the CLD adjunct 40 through the D-channel of a PRI interface (35). The message contains, inter alia, the CPN and Called Party Number parameters of the IAM. The adjunct 40 then requests the HAS 30 (or TAS 25 in the case of a direct connection without REACH) to establish a voice path between the caller 2 and the adjunct 40. A voice connection is established between the HAS 30 and the adjunct 40 through the B-channel of the PRI interface 35. The CLD adjunct 40 checks the presentation status of the CPN parameter sent to it by the HAS 30 (or TAS 25). If the presentation status of the incoming CPN parameter indicates "presentation allowed", the adjunct 40 formulates a query to determine whether the CPN appears in a database of Inter-LATA CID permanently blocked lines. The database resides in the adjunct 40.

The adjunct 40 then sends an interruptible announcement over the voice channel alerting the caller 2 that the called party 6 is an Inter-LATA CID subscriber and providing the caller 2 with instructions on how to block or unblock CPN delivery. During or after the announcement, the caller 2 may block or unblock delivery of the CPN by responding via a voice or Dual-tone Multifrequency (DTMF) interface.

After time "T" or after interaction by the caller 2, the presentation status of the outgoing CPN is determined by the adjunct in accordance with Table I below:

TABLE I

| Presentation Field of Incoming CPN | CPN is in the Database of Permanently Blocked Lines | Caller Action | Presentation Field of Outgoing CPN |
|---|---|---|---|
| "00" = "presentation allowed" "00" | No | Nothing Block Unblock | "00" "01" "00" |
| | Yes | Nothing Block Unblock | "01" "01" "00" |
| "01" = "presentation restricted" | No need to formulate database query | Nothing Block Unblock | "01" "01" "00" |

If the presentation status of the outgoing CPN parameter is determined to be "01" (indicating "presentation restricted"), the CLD adjunct 40 compares the destination number against information contained in a Destination Number Trigger Table (DNTT) resident in the adjunct 40 to determine whether the called party 6 subscribes to an Inter-LATA "Block The Blocker" (BTB) feature. If the called party 6 is a BTB subscriber, the CLD adjunct 40 plays another announcement informing the caller 2 that the called party 6 does not accept anonymous calls, and sends a message to the HAS 30 to tear down the connection.

Otherwise, the CLD adjunct 40 instructs the HAS 30 to crank back the call to the TAS 25 using the RETREAT+ (RETREAT following a caller/adjunct interactive call) feature.

The TAS 25 need not check the ICID Subscription Table again because it has already done so for this call. The TAS 25 hands the call over to the terminating LEC 8 together with the outgoing CPN parameter. It is assumed that an access tandem between the TAS 25 and the terminating LEC 8 passes the CPN parameter unchanged.

The terminating LEC 8 checks the subscription of the destination number to the Inter-LATA CID delivery feature. Based on the presentation status of the received CPN parameter, the terminating LEC 8 can perform either of the following:

(1) If the called party 6 is not an Inter-LATA CID subscriber, the terminating LEC 8 does not deliver CPN information to the called party's 6 line;

(2) If the called party 6 is an Inter-LATA CID subscriber and the presentation status of the received CPN is "00" indicating "presentation allowed", the terminating LEC 8 delivers the CPN to the called party's 6 line. If the CPN is unavailable (e.g. cases where the originating LEC 4 uses MF signaling), "O" is delivered to the called party's 6 line; or (3) If the called party 6 is an Inter-LATA CID subscriber and the presentation status of the received CPN is "01" indicating "presentation restricted", the terminating LEC 8 delivers a "P" to the called party's 6 line.

At the called party 6 location, the call proceeds normally. The called party 6 receives the caller's number, "O" or "P" on his display device between the first and second ring.

The many features and advantages of the present invention are apparent from the detailed specification, and thus, it is intended by the appended claims to cover all such features and advantages of the invention which fall within the true spirit and scope of the present invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

We claim:

1. A system for detecting when a caller places a telephone call to a dialed number, corresponding to a destination telephone call location, which is authorized to receive origination information about said telephone call, including said caller's telephone number, comprising:

a switching network having one or more switches for routing telephone call activity;

said switching network coupled to an originating telephone call location and the destination telephone call location via respective local exchange carrier end offices;

a signaling network coupling the switches in said switching network to one another and to the respective local exchange carrier end offices for routing said caller's origination information and destination information associated with said telephone call;

said switching network further including means for analyzing said destination information associated with said telephone call to detect when said dialed number is authorized to receive said origination information;

an adjunct coupled to said switching network, having a processor adapted to receive said caller's origination information and said destination information from said switching network, in response to the detection by said analyzing means of a dialed number authorized to receive said origination information, and said processor is further adapted to signal said originating telephone call location, via said switching network, when said dialed number is authorized to receive said origination information.

2. The system of claim 1 wherein:

said adjunct further includes means for blocking or unblocking delivery of said caller's origination information to said destination telephone call location; and said originating telephone call location includes means for transmitting a voice or DTMF command to said adjunct via said switching network to direct said adjunct to block or unblock delivery of said caller's origination information.

3. The system of claim 2 wherein:

said processor is further adapted to transmit instructions to said caller on the procedure for directing said adjunct to block or unblock delivery of said caller's origination information.

4. The system of claim 3 wherein:

said adjunct further includes a database means for analyzing said destination information to determine whether said dialed number accepts anonymous telephone calls.

5. The system of claim 1 wherein:

said switching network includes a terminating switch coupled to said terminating local exchange carrier end office and a hand-off switch;

said hand-off switch coupled to said adjunct via an interface; and said terminating switch including said means for analyzing said destination information.

6. The system of claim 1 wherein said originating telephone call is coupled to said local exchange carrier end office via a private branch exchange.

7. The system of claim 1 wherein said originating telephone call location is coupled to said switching network via a private branch exchange.

8. A method for detecting when a caller places a telephone call to a dialed number, corresponding to a destination telephone call location, which is authorized to receive origination information about said telephone call, including said caller's telephone number, comprising the steps of:

routing a telephone call initiated by a caller from an originating telephone call location over a switching network to said destination telephone call location;

said switching network coupled to said originating telephone call location and said destination telephone call location via respective local exchange carrier end offices;

routing said caller's origination information and destination information over a signaling network;

said signaling network coupling the switches in said switching network to one another and to the respective local exchange carrier end offices;

analyzing within said switching network said destination information associated with said telephone call to detect when said dialed number is authorized to receive said origination information;

receiving at an adjunct coupled to said switching network said caller's origination information and said destination information in response to the detection by said switching network of a dialed number authorized to receive said origination information;

said adjunct signaling said origination telephone call location via said switching network when said dialed number is authorized to receive said origination information.

9. The method of claim 8 further comprising the steps of:

said adjunct blocking or unblocking delivery of said caller's origination information to said destination telephone call location; and said originating telephone call location transmitting a voice or DTMF command to said adjunct via said switching network to direct said adjunct to block or unblock delivery of said caller's origination information.

10. The method of claim 9 wherein:

said signaling further includes instructions to said caller on the procedure for directing said adjunct to block or unblock delivery of said caller's origination information.

11. The method of claim 10 further comprising the steps of:

said adjunct analyzing said destination information to determine whether said dialed number accepts anonymous telephone calls.

12. The method of claim 8 wherein:

said switching network includes a terminating switch coupled to said terminating local exchange carrier end office and a hand-off switch;

said hand-off switch coupled to said adjunct via an interface; and FURTHER COMPRISING THE STEP OF:

said terminating switch analyzing said destination information associated with said telephone call to detect when said dialed number is authorized to receive said origination information.

13. The method of claim 8 wherein said originating telephone call location is coupled to said originating local exchange carrier end office via a private branch exchange.

14. The method of claim 8 wherein said originating telephone call location is coupled to said switching network via a private branch exchange.

* * * * *